(12) United States Patent
Pissay et al.

(10) Patent No.: US 9,244,717 B2
(45) Date of Patent: Jan. 26, 2016

(54) METHOD AND SYSTEM FOR VISUALIZING LINKED CLONE TREES

(75) Inventors: Sandeep Srinivasa Rao Pissay, Bangalore (IN); Vipin Balachandran, Kollam (IN)

(73) Assignee: VMware, Inc., Palo Alto, CA (US)

( * ) Notice: Subject to any disclaimer, the term of this patent is extended or adjusted under 35 U.S.C. 154(b) by 423 days.

(21) Appl. No.: 13/434,592

(22) Filed: Mar. 29, 2012

(65) Prior Publication Data

US 2013/0263119 A1   Oct. 3, 2013

(51) Int. Cl.
*G06F 9/455*   (2006.01)

(52) U.S. Cl.
CPC .. *G06F 9/45558* (2013.01); *G06F 2009/45579* (2013.01)

(58) Field of Classification Search
CPC .............................. G06F 9/455; G06F 9/45558
USPC ............................................................. 718/1
See application file for complete search history.

(56) References Cited

U.S. PATENT DOCUMENTS

| | | | |
|---|---|---|---|
| 7,533,229 B1 | 5/2009 | van Rietschote | |
| 7,941,470 B2 | 5/2011 | Le | |
| 8,056,076 B1 | 11/2011 | Hutchins | |
| 8,135,930 B1 * | 3/2012 | Mattox et al. ................. | 711/162 |
| 8,234,233 B2 * | 7/2012 | Zhou .............................. | 706/50 |
| 8,478,801 B2 * | 7/2013 | Hutchins ........... G06F 17/30115 | 707/803 |
| 8,856,078 B2 * | 10/2014 | Knowles ............. G06F 9/45558 | 707/649 |
| 8,886,865 B1 * | 11/2014 | Huang .................. G06F 3/0665 | 711/6 |
| 8,910,156 B1 * | 12/2014 | Kenchammana-Hosekote ............ G06F 9/45533 | 718/1 |
| 2003/0063134 A1 * | 4/2003 | Lord .................. G06F 17/30961 | 715/853 |
| 2008/0134175 A1 * | 6/2008 | Fitzgerald ........... G06F 9/45533 | 718/1 |
| 2009/0037680 A1 * | 2/2009 | Colbert et al. ................. | 711/162 |
| 2010/0049930 A1 * | 2/2010 | Pershin et al. ................. | 711/162 |
| 2010/0257523 A1 * | 10/2010 | Frank .................. G06F 9/45558 | 718/1 |
| 2012/0117342 A1 * | 5/2012 | Karonde et al. .............. | 711/162 |
| 2013/0268542 A1 * | 10/2013 | Dinwoodie .................... | 707/748 |

OTHER PUBLICATIONS

VMWare Labs Lctree "Linded Clone Visualizer for vCloud Director", Nov. 28, 2012, pp. 1-9. VMWare Labs online address : "http://download3.vmware.com/software/vmw-tools/lctree/README.pdf".*

U.S. Appl. No. 11/545,662, filed Oct. 10, 2006, entitled "Offloading Operations to a Replicate Virtual Machine."

(Continued)

*Primary Examiner* — Emerson Puente
*Assistant Examiner* — Willy W Huaracha

(57) ABSTRACT

A virtual computer system, including a plurality of virtual machines (VMs) running on one or more host computers, is configured to manage virtual disks in a manner to facilitate making copies of one or more virtual machines (VMs) by means of a method known as linked cloning. Techniques are disclosed for scanning a storage system to determine the set of VMs, identifying virtual disks associated with each VM, examining parent/child relationships among the virtual disks, and displaying the virtual disk hierarchy. Redundant virtual disks may be identified as the set of virtual disks that have exactly one child disk and that are not associated with a snapshot. Provisions for generating a relocate list to support migration of a linked clone may also be utilized.

20 Claims, 12 Drawing Sheets

(56) References Cited

OTHER PUBLICATIONS

U.S. Appl. No. 12/184,134, filed Jul. 31, 2008, entitled "Online Virtual Machine Disk Migration." Published as US 2009-0037680 A1 on Feb. 5, 2009.

U.S. Appl. No. 12/390,819, filed Feb. 23, 2009, entitled "Extending Server-Based Desktop Virtual Machine Architecture to Client Machines." Published as US 2009-0216975 A1 on Aug. 27, 2009.

* cited by examiner

METHOD AND SYSTEM FOR VISUALIZING LINKED CLONE TREES

BACKGROUND

Software for managing a virtualized data center is responsible for monitoring physical hosts and virtual machines (VMs) running in the physical hosts and, further, for performing management operations such as provisioning and configuration tasks. One example of such management software is vSphere™ available from VMware, Inc. of Palo Alto, Calif.

Provisioning is the process of creating and deploying a VM, including assigning and configuring resources, such as processors, memory, network, and disk storage, associated with the VM. When deploying multiple VMs with similar characteristics, provisioning may be more efficient by using a process called cloning. With cloning, a VM is first provisioned according to a specific configuration. The VM is then cloned one or more times to create multiple VMs with the same configuration as the original VM. Cloning a virtual machine can save time when deploying many similar virtual machines, as compared with creating and configuring each virtual machine individually.

One form of cloning creates a complete and independent copy of a virtual machine, referred to herein as full cloning. Another form of cloning creates a copy of a virtual machine that shares virtual disks with the parent virtual machine in an ongoing manner, referred to herein as linked cloning. A linked clone is a duplicate of a parent virtual machine that uses the same base disk as the original, with a chain of "redo logs" (also known as "delta disks") to track the differences between the original and the linked clone. Linked cloning conserves disk space, as compared with a full clone, and allows multiple virtual machines to use the same software installation. In addition, creating a clone of a virtual machine using linked cloning typically is much faster as compared to creating a clone using full cloning.

One disadvantage of linked cloning is performance degradation when the chain of redo logs increases in length, or where multiple disk chains branch from the same base disk forming a virtual disk tree. The disadvantage may be especially noticeable in a cloud computing environment, where a virtual disk tree may contain hundreds of linked clones and support hundreds of VMs.

SUMMARY

One or more embodiments of the present invention provide a method of displaying virtual machine disks in a hierarchy. The method includes identifying virtual disks corresponding to virtual machines, examining parent/child relationships associated with the virtual disks to populate a data structure, and displaying the virtual disks in a hierarchy using the populated data structure. In further embodiments, the method includes receiving a selection of a virtual machine to relocate, and determining a set of virtual disks to relocate by identifying a base virtual disk of the virtual machine and all child nodes of the base virtual disk of the virtual machine using the data structure.

Additional embodiments of the present invention provide a method of removing redundancies within a hierarchy of virtual machine disks. The method includes identifying virtual disks corresponding to virtual machines, examining parent/child relationships associated with the virtual disks to locate a virtual disk with only one child virtual disk, and merging the virtual disk with the child virtual disk.

Embodiments of the present invention further include a non-transitory computer-readable storage medium storing instructions that when executed by a computer system cause the computer system to perform one of the methods set forth above.

DETAILED DESCRIPTION

Figure 1:
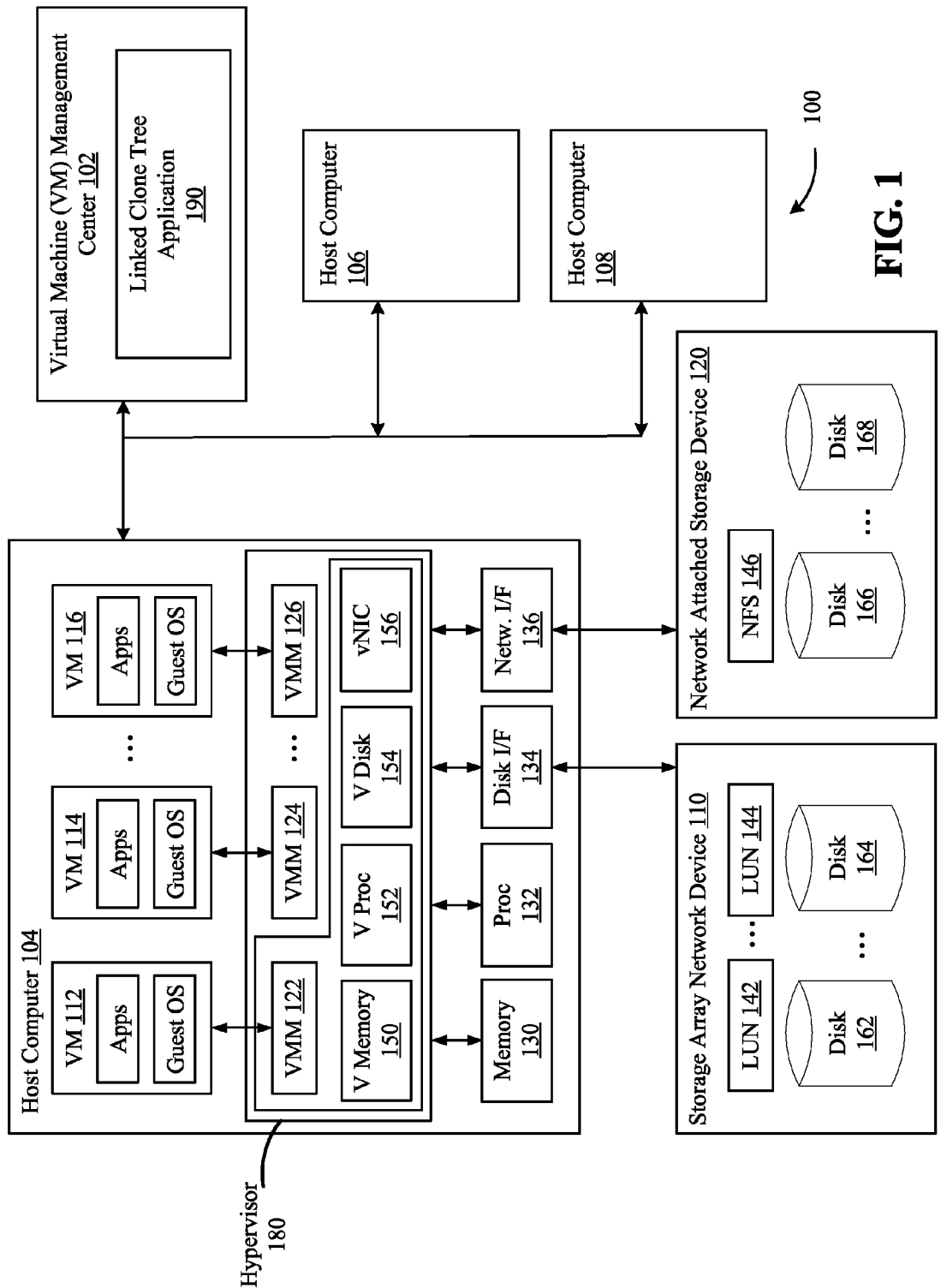
FIG. 1 illustrates a block diagram of a virtualized computer system with which one or more embodiments of the present invention may be utilized.

FIG. 1 illustrates a block diagram of a virtualized computer system 100 with which one or more embodiments of the present invention may be utilized. As illustrated, virtualized computer system 100 includes one or more host computers 104, 106, 108, a storage array network (SAN) device 110, a network attached storage (NAS) device 120, and a virtual machine management center 102. For clarity, only a first host computer 104 is shown in detail.

Host computers 104, 106, 108 (also referred to as "servers") are configured to support a virtualized environment and to deliver one or more application services related to information technology, including but not limited to, web services, database services, data processing services, and directory services. In larger systems, a plurality of host computers 104, 106, 108 may form a data center (not shown). Host computers 104, 106, 108 provide a virtualization layer that abstracts processor, memory, storage, and/or networking resources into multiple virtual machines (VMs) that run concurrently thereon. Specific information pertaining to the virtualization settings and configurations of the host computer, and any VMs included therein, is transmitted to VM management center 102, discussed below.

Host computer 104 includes conventional components of a computing device, such as a memory 130, a processor 132, a disk interface 134, and a network interface 136. Disk interface 134, which may be a "host bus adapter" (HBA), connects host computer 104 to storage devices such as SAN device 110. Network interface 136, which may be a "network interface controller" (NIC), connects host computer 104 to a network and in some embodiments, to storage devices, such as NAS device 120. Although FIG. 1 illustrates host computer 104 being connected to both SAN device 110 and NAS device 120, host computer 104 may be operable with either SAN device 110 or NAS device 120 alone.

As shown, one or more virtual machines VM 112, VM 114, and VM 116 are configured within host computer 104, which share the hardware resources of host computer 104. The virtual machines run on top of a software interface layer 180 (referred to herein as a "hypervisor") that enables sharing of the hardware resources of host computer 104 by the virtual machines. Hypervisor 180 may run on top of the operating system of host computer 104 or directly on hardware components of host computer 104. Each virtual machine includes a guest operating system and one or more guest applications running on top of the guest operating system. As also shown, each VM 112, 114, 116 has a corresponding virtual machine monitor (VMM) 122, 124, 126, as provided in hypervisor 180, that provides a virtual hardware platform for corresponding VMs. For clarity, only a first VMM 122 is shown in detail. As shown, the emulated hardware of VMM 122 includes a virtual memory 150, a virtual processor 152, a virtual disk 154 and a virtual NIC 156.

SAN device 110 includes one or more logical units (LUNs) 142, 144 that are logically provisioned from disks 162, 164. SAN device 110 provides block level storage to host computer 104 via a defined protocol such as SCSI. LUNs 142, 144 provide a linear, block addressable storage array to associated host computers 104, 106, 108.

NAS device 120 includes a network file system (NFS) 146 and one or more disks 166, 168. NAS device 120 is exposed to host computer 104 as a file system. Accordingly, host computer 104 accesses NAS device 120 via file-based commands. NFS 146 provides the mapping from various filenames to corresponding locations on disks 166, 168.

VM management center 102 is a computer program that resides and executes in a central server, which may exist as a separate computing system dedicated for this purpose. Alternatively, VM management center 102 may execute on one of host computers 104, 106, 108 as a virtual machine. VM management center 102 is in communication with each of host computers 104, 106, 108, and carries out administrative tasks for virtualized computer system 100 including, but not limited to, managing the host computers, managing the virtual machines running within each host computer, provisioning the virtual machines, migrating virtual machines from one host computer to another, allocating physical resources, such as processor and memory, load balancing between host computers, and so on.

VM management center 102 may perform administrative tasks for virtualized computer system 100 autonomously, or may perform administrative tasks in response to one or more commands issued by a system administrator. A system administrator may access VM management center 102 via one or more applications running on VM management center 102, including, without limitation, a linked clone tree application 190 (referred to herein as an "lctree application"). As further described below, lctree application 190 performs various functions including generating a hierarchy of virtual disks to be displayed, identifying redundant virtual disks that may be consolidated, and generating a relocate recommendation list that specifies a recommended order in which to relocate virtual disks during migration of an associated VM. Applications such as lctree application 190 may include instructions that present a graphical user interface or a command-line interface to the system administrator.

When provisioning a new VM 112, it is often advantageous to start by copying an existing VM with desirable characteristics. This process is referred to herein as "cloning." Cloning a VM creates another VM (the "clone") that can execute independently from the original VM. Cloning typically involves providing the clone with a unique identity including, without limitation, a new system identification (SID) and new computer name.

A system administrator may provision a VM with a specific guest operating system, certain application software, and so on, and then use the VM as a base "template" virtual machine. The template VM is rarely modified thereafter, but may then be cloned many times to create cloned copies of the template VM. These clones become additional VMs to be deployed to other users of virtualized computer system 100. The template VM includes a base virtual disk ("base disk") including the guest OS and application software. As used herein, "disk" refers to any data storage device that can store data which can thereafter be input to a computer system including, without limitation, a memory or input/output cache on a computer, a disk cache including data to be written to a more persistent storage medium, a hard drive, a NAS system, a SAN system, a magnetic tape, or a solid-state device. The base disk resides in a persistent storage such as SAN device 110 or NAS device 120. This base disk must be made available to each clone of the template VM. One approach is full cloning, where a copy of the entire base disk is made and then assigned to the clone. However, the base disk is typically quite large, and therefore copying the entire base disk is time consuming and consumes more storage space than otherwise needed. Another approach is linked cloning, where both the template VM and the clone include a link to the base disk and each may then access the data within the base disk. In addition, another disk is created to process disk writes made by the clone so that the base disk is not modified. This other disk is referred to herein as a "redo log" or alternatively as a "delta disk." These redo logs include only the differences ("deltas") as compared to the base disk. Thus, the base disk remains intact and available for future cloning, while various clones of the template may write to their respective redo logs without affecting the base disk or the redo logs of other clones. As further described below, additional redo logs may be created in order to capture the state of a VM's virtual disk at a specific point in time. The new redo log points to the immediately prior redo log, which in turn points to the prior redo log, and so on, until the base disk is reached. Thus, virtual disk 154 for VM 112 is represented by a base disk followed by a chain of redo logs up to and including the most recent redo log associated with VM 112.

Figure 2:
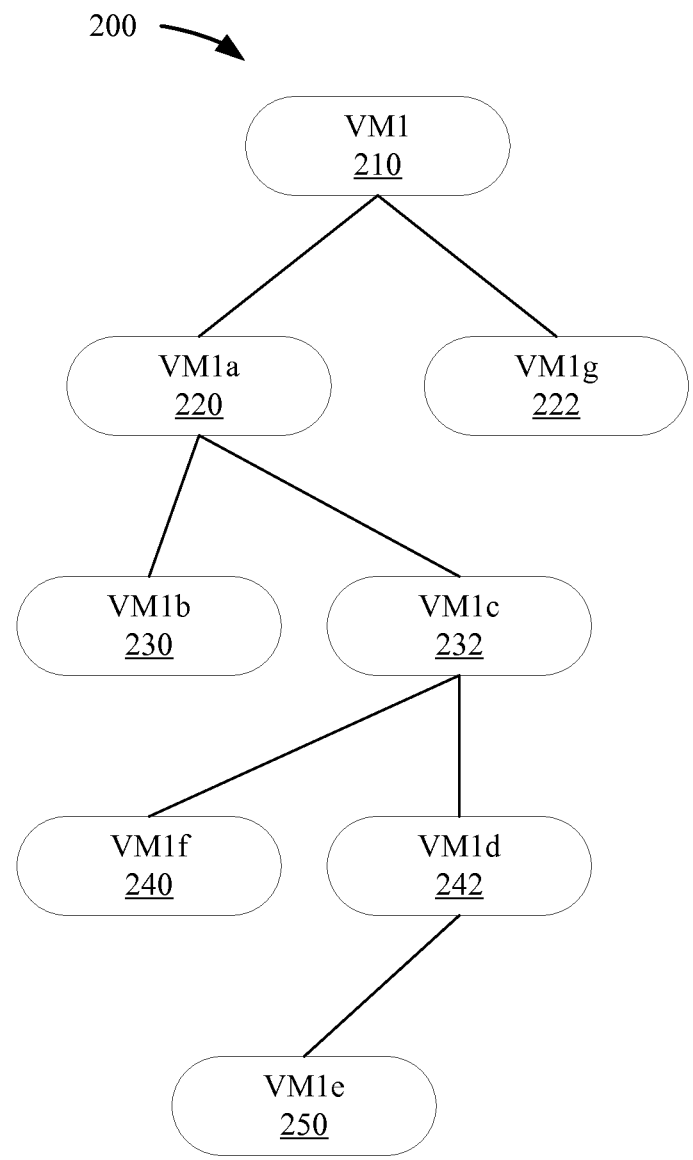
FIG. 2 is a conceptual diagram of how linked clones are related in a hierarchy.

FIG. 2 is a conceptual diagram of how linked clones are related in a hierarchy 200. As shown, hierarchy 200 includes a base disk VM1 210 and a number of redo logs 220, 222, 230, 232, 240, 242, 250. Hierarchy 200 is depicted as a tree where each path is referred to herein as a "branch." Each base disk, redo log, or folder in the tree is referred to herein as a "node." At the top of the tree, VM1 210 represents a base disk associated with a VM such as a template VM. The VM associated with base disk VM1 210 is then cloned, forming two redo logs VM1a 220 and VM1g 222. The VM associated with redo log VM1a 220 is then cloned, forming two redo logs VM1b 230 and VM1c 232. The process continues until hierarchy 200 is formed. Each horizontal row represents a level of hierarchy 200 where the first level comprises base disk VM1 210, the second level comprises redo logs VM1a 220 and VM1g 222, and so on. A parent/child relationship exists when a base disk or redo log at one level in hierarchy 200 is associated with a base disk or redo log at an adjacent level in hierarchy 200. For example, base disk VM1 210 is the parent of two child redo logs represented by redo logs VM1a 220 and VM1g 222. A leaf is a base disk or redo log that has no child. In hierarchy 200, redo logs VM1g 222, VM1b 230, VM1f 240, and VM1e 250 are leaves. This hierarchy of base disks and redo logs is managed by VMMs 122, 124, 126 for their respective VMs 112, 114, 116.

An advantage of creating redo logs is that only the differences between the redo log and the respective parent disk at a particular point in time are stored rather than a full image of the virtual disk. In a full cloning example, all nodes shown in FIG. 2 would include full disk images rather than only difference information. In such a case, the amount of storage required to contain the nodes represented by FIG. 2 is higher as compared with storing redo logs, resulting in more efficient storage. Base disks and associated redo logs are in typically stored as files within SAN device 110 or NAS device 120. Thus, by using linked cloning, the amount of virtual disk storage space required on SAN device 110 and NAS device 120 is reduced as compared with full cloning. Linked cloning may also result in faster VM provisioning. After the creation of a linked clone, further disk writes from the source VM and the target VM are stored in their individual redo logs.

Figure 3:
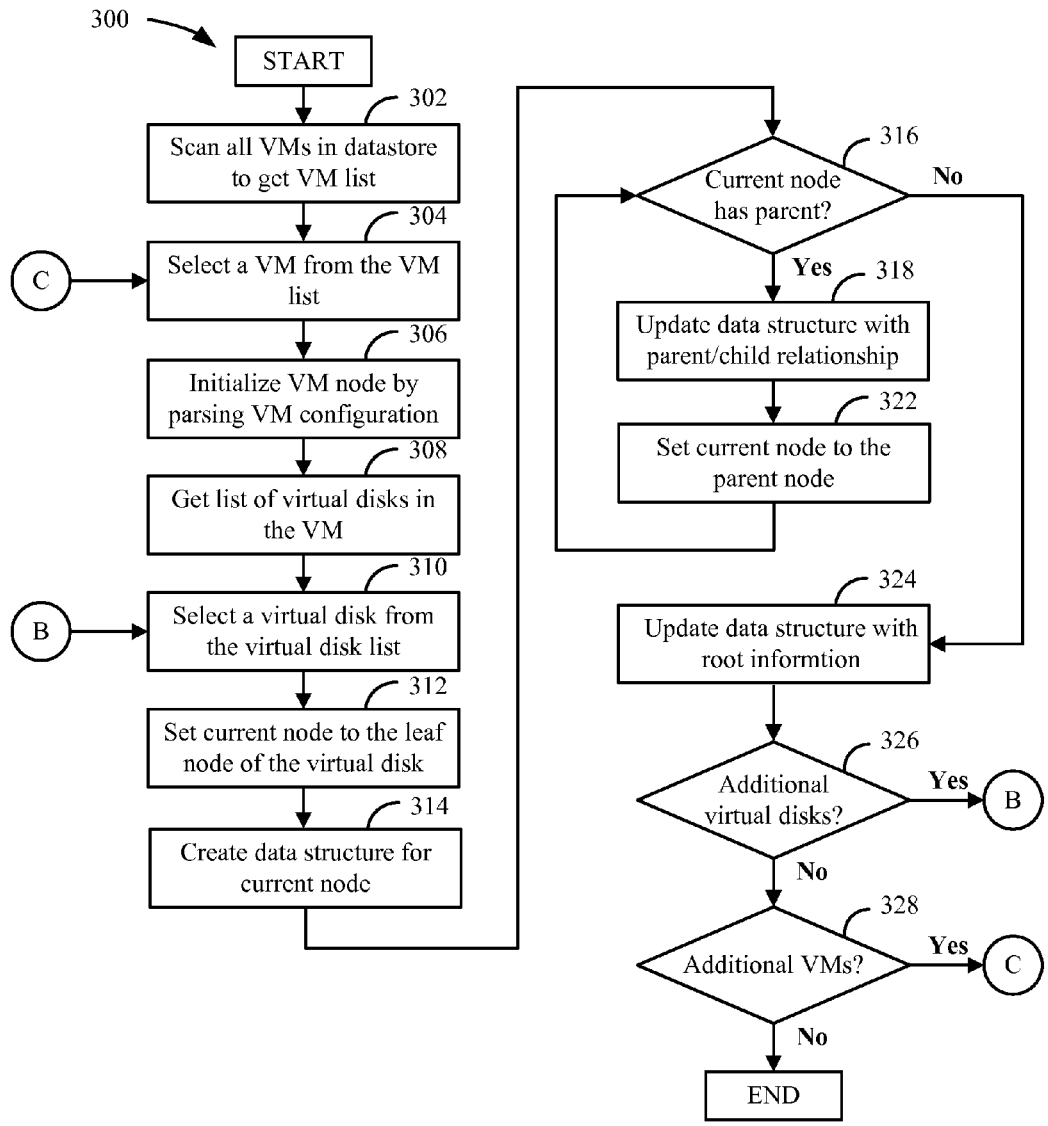
FIG. 3 depicts a flow diagram for parsing virtual machines and creating a database or some other data structure from which a virtual disk hierarchy may be displayed, according to one embodiment of the invention.

One or more embodiments of the present invention provide a view of the linked clone relationships of the various VMs within host computers 104, 106, 108. To create this view, lctree application 190 parses VMMs 122, 124, 126 to extract information associated with the various base disks and redo logs and determines the associated parent/child relationships. FIG. 3 depicts a flow diagram 300 for parsing virtual machines and creating a database or some other data structure from which a virtual disk hierarchy may be displayed, according to one embodiment of the invention. While the example operations are depicted as being performed by the systems illustrated in FIG. 1, it is contemplated that embodiments of the invention may be performed by other suitable systems.

At step 302, lctree application 190 scans all VMs within a given datastore to create a VM list. A datastore is a repository for data, such as virtual disks, associated with one or more VMs. A datastore may provide storage for the VMs corresponding to one or more host computers. At step 304, lctree application 190 selects a VM from the VM list. At step 306, lctree application 190 parses the selected VM's configuration and populates a data structure with this configuration information. At step 308, lctree application 190 scans the data structure including the configuration to find the virtual disks associated with the VM. Lctree application 190 then creates a list of the found virtual disks. At step 310, lctree application 190 selects a virtual disk from the virtual disk list. At step 312, lctree application 190 sets the current node to the leaf node of the selected virtual disk. The current node is defined as the node from which lctree application 190 is currently scanning the list of virtual disks to determine parent/child relationships. The leaf node is the last node in the chain of redo logs associated with a base disk. A leaf node is a node that has no child nodes.

At step 314, lctree application 190 creates a data structure associated with the current node. At step 316, lctree application 190 determines whether the current node has a parent node. The parent node of a current node is node that is one level higher in the chain of redo logs associated with a base disk. Where a parent node exists, the current node is referred to as a child of the parent node. If the current node has a parent, then the method proceeds to step 318, where lctree application 190 updates the data structure associated with the current node to reflect the parent/child relationship. At step 322, lctree application 190 sets the new current node to the parent node of the current node. The method then returns to step 316 to process the new current node. The process continues until, at step 316, lctree application 190 determines that the current node has no associated parent node. This condition occurs when the current node is a base disk. The method then proceeds to step 324, where lctree application 190 updates the data structure associated with the current node to record the base disk information.

At step 326, lctree application 190 determines whether there are additional virtual disks associated with the current VM. If there are additional virtual disks, then the method returns to step 310, where lctree application 190 determines parent/child relationships for another virtual disk. If there are no additional virtual disks associated with the selected VM, then the method proceeds to step 328, where lctree application 190 determines whether there are additional VMs within the datastore. If there are additional VMs, then the method returns to step 304, where lctree application 190 parses the VM configuration for another virtual machine. If there are no additional VMs associated with the datastore, then the method terminates.

Figure 4A:
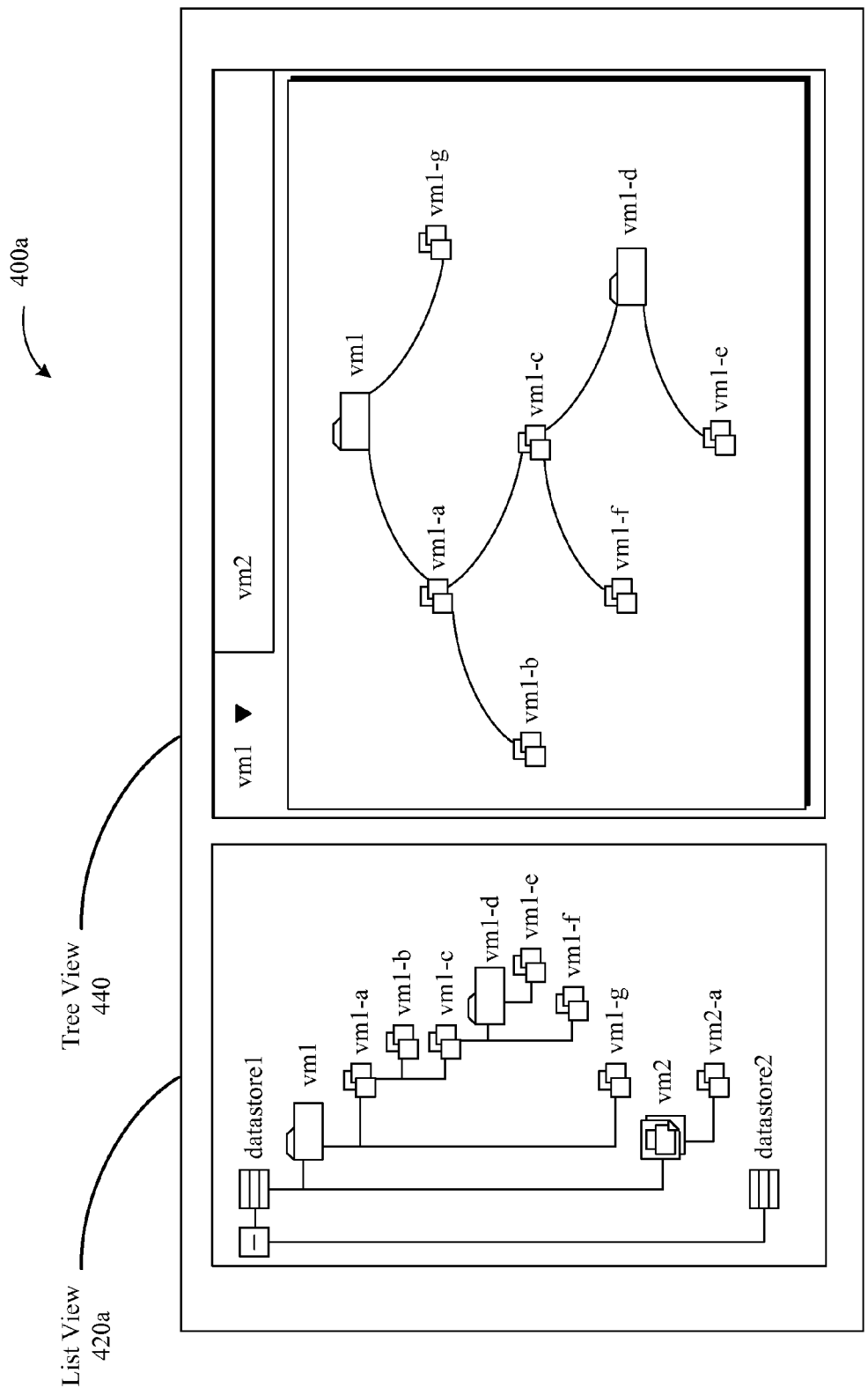
FIG. 4A illustrates a display of a virtual disk hierarchy, according to one embodiment of the present invention.

FIG. 4A illustrates a display 400a of a virtual disk hierarchy, according to one embodiment of the present invention. As shown, the display includes a list view 420a and a tree view 440. List view 420a and tree view 440 are generated using the parent/child relationships stored in the data structure that was created in association with the method described in conjunction with FIG. 3. List view 420a represents the hierarchy as a list of elements, indented to show levels within the hierarchy. At the top level, the list view depicts two datastores, labeled as datastore-1 and datastore-2. For clarity, only datastore-1 is shown in expanded view. Datastore-1 includes two VMs, shown as vm1 and vm2. The first VM, vm1, is expanded to show a representation of example hierarchy 200. Node vm1 is expanded to show two child nodes vm1-a and vm1-g. Child nodes vm1-a and vm1-g are indented one level with respect to vm1 to show the parent/child relationship. Node vm1-a has two child nodes, shown as vm1-b, a leaf node, and vm1-c, and so on. The list continues until all child nodes of the vm1-a branch are shown. The list view then displays node vm1-g. Node vm1-g is a leaf node, and as such, there are no child nodes shown below vm1-g in list view 420a. Note that vm1 and vm1-d are represented by means of a folder icon. As such, base disk vm1 and vm1-d are associated with one or more child nodes, but vm1 and vm1-d themselves do not represent a base disk (or redo log) associated with a VM. Such nodes are referred to herein as "folder nodes." A folder node represents a node of a VM that was parent to one or more linked clone VMs but subsequently deleted. In such a case, the base disks corresponding to the folder node are retained because the base disks are still used by the child VMs. The other nodes in list view 420a are represented by a different icon, indicating that these nodes are either base disks or redo logs associated with a VM (referred to herein as "VM nodes"). A second VM, vm2, is also shown in list view 420a where vm2 has a single child node, represented as vm2-a.

Tree view 440 represents hierarchy 200 in a graphical form, similar to that shown in FIG. 2. As such, tree view 440 presents the various levels vertically, as compared with list view 420a which presents the various levels as levels of indentation with respect to other nodes. Thus, tree view 440 shows the same hierarchy as list view 420a, but in different form. The first level is presented at the top of tree view 440, represented by base disk VM1 210. The second level is presented immediately below the first level, and includes child nodes of the base disk VM1 210, represented by VM1*a* 220 and VM1*g* 222, and so on. As shown, a selection tab at the top of tree view 440 may be utilized to select either vm1 or vm2 for display.

List view 420*a* and tree view 440 are exemplary of various displays that may be utilized to represent hierarchy 200 and the associated hierarchies for other VMs within virtual computer system 100. As such, other views and displays may be employed within the scope of the present disclosure.

As described above, one disadvantage of linked cloning is performance degradation when the chain of redo logs increases in length. When a VM writes data to disk storage, the result of the write operation is saved to the latest redo-log, that is, the leaf node in the corresponding chain of redo-logs. When a VM reads data from disk, the latest redo-log (the leaf node) is accessed first to satisfy the read operation. If the data location is not included in the leaf node, the leaf node's parent (the redo-log prior to the leaf) is then accessed. Each parent redo-log is searched in turn until the data location is found, and the read operation is satisfied. Thus, as the chain of redo-logs increases in length, latency of read operations from disk may increase, resulting in reduced performance. To alleviate this problem, certain redo logs that have only one child may be consolidated with the redo log's child node, resulting in shorter redo log chains and improved performance. Redo logs that are associated with a snapshot, however, should not be consolidated with their respective child nodes. A snapshot represents the state of a VM from which the VM may later be restored. The snapshot captures the total state of the VM, including, without limitation, virtual CPU registers, contents of virtual memory and virtual caches, and the state of associated virtual disks. By modifying the method described above in conjunction with FIG. 3, lctree application 190 may identify redundant redo logs that may be later consolidated.

Figure 4B:
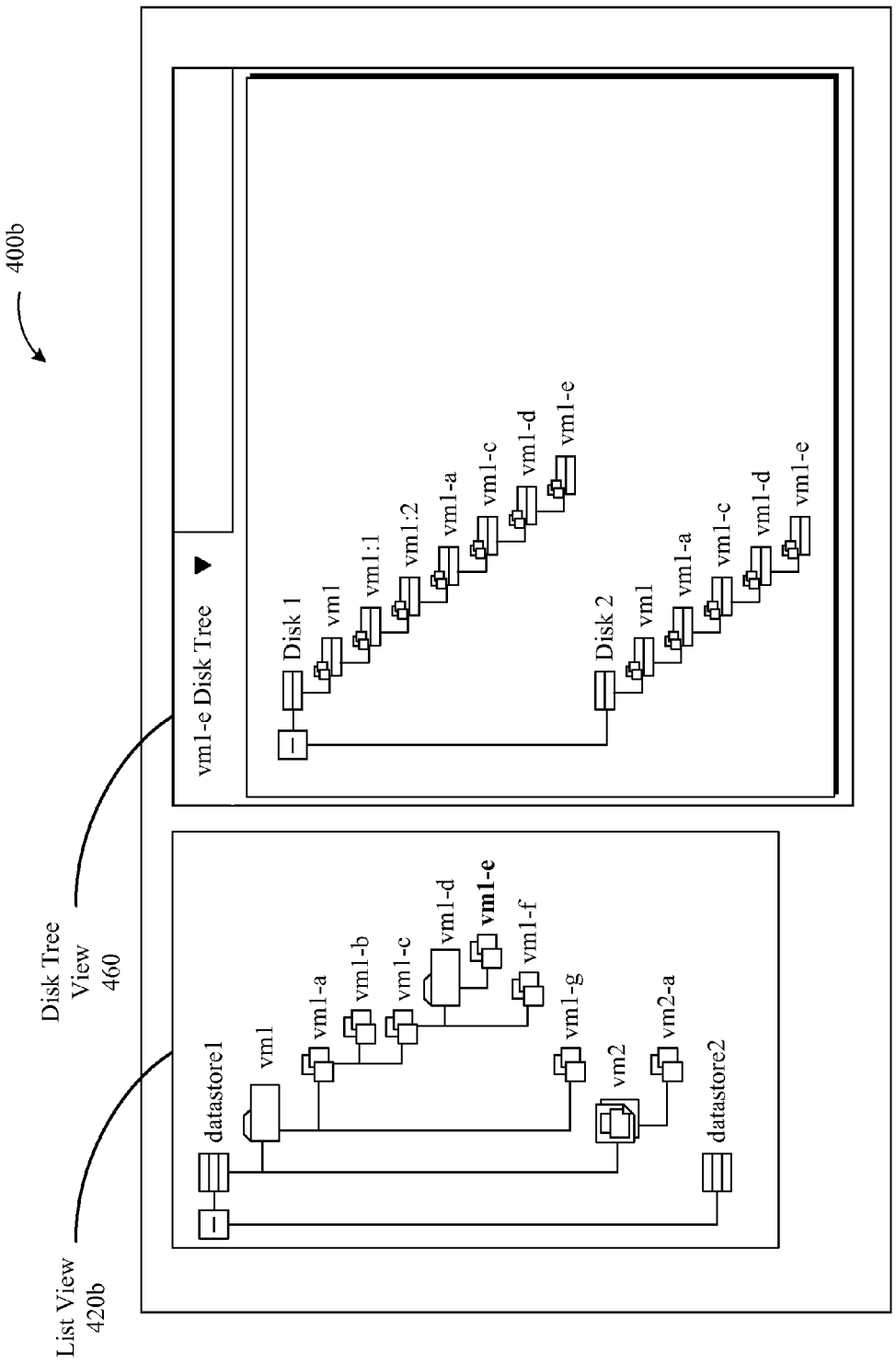
FIG. 4B illustrates a display of a virtual disk hierarchy, according to another embodiment of the present invention.

FIG. 4B illustrates a display 400*b* of a virtual disk hierarchy, according to another embodiment of the present invention. As shown, the display includes a list view 420*b* and a disk tree view 460. List view 420*b* is displayed in a similar manner to list view 420*a* except as described below. In this embodiment, vm1-*e* has been selected for disk tree view, as indicated by bold type font in list view 420*b*. Consequently, the right portion of the display includes disk tree view 460 corresponding to vm1-*e*. As shown, vm1-*e* includes two disks, labeled as Disk 1 and Disk 2 in disk tree view 460. In this example, Disk 1 was created for vm1 when vm1 was originally provisioned. Accordingly, the first level in the disk tree for Disk 1 points to vm1. Two snapshots of vm1 were subsequently created, as shown by vm1:1 and vm1:2 in the next two levels of the disk tree corresponding to Disk 1. Disk 2 was then created for vm1 after the two snapshots. Accordingly, the first level in the disk tree for Disk 2 points to vm1, but the subsequent snapshots are not shown in disk tree for Disk 2. The disk tree for both Disk 1 and Disk 2 also show the intervening linked clones between vm1 and vm1-*e*, namely vm1-*a*, vm1-*c*, and vm1-*d*. The last level in the disk tree for both Disk 1 and Disk 2 shows vm1-*e*, the selected VM. It should be recognized that disk creation sequences other than the sequence described above can generate disk tree view 460.

Figure 5:
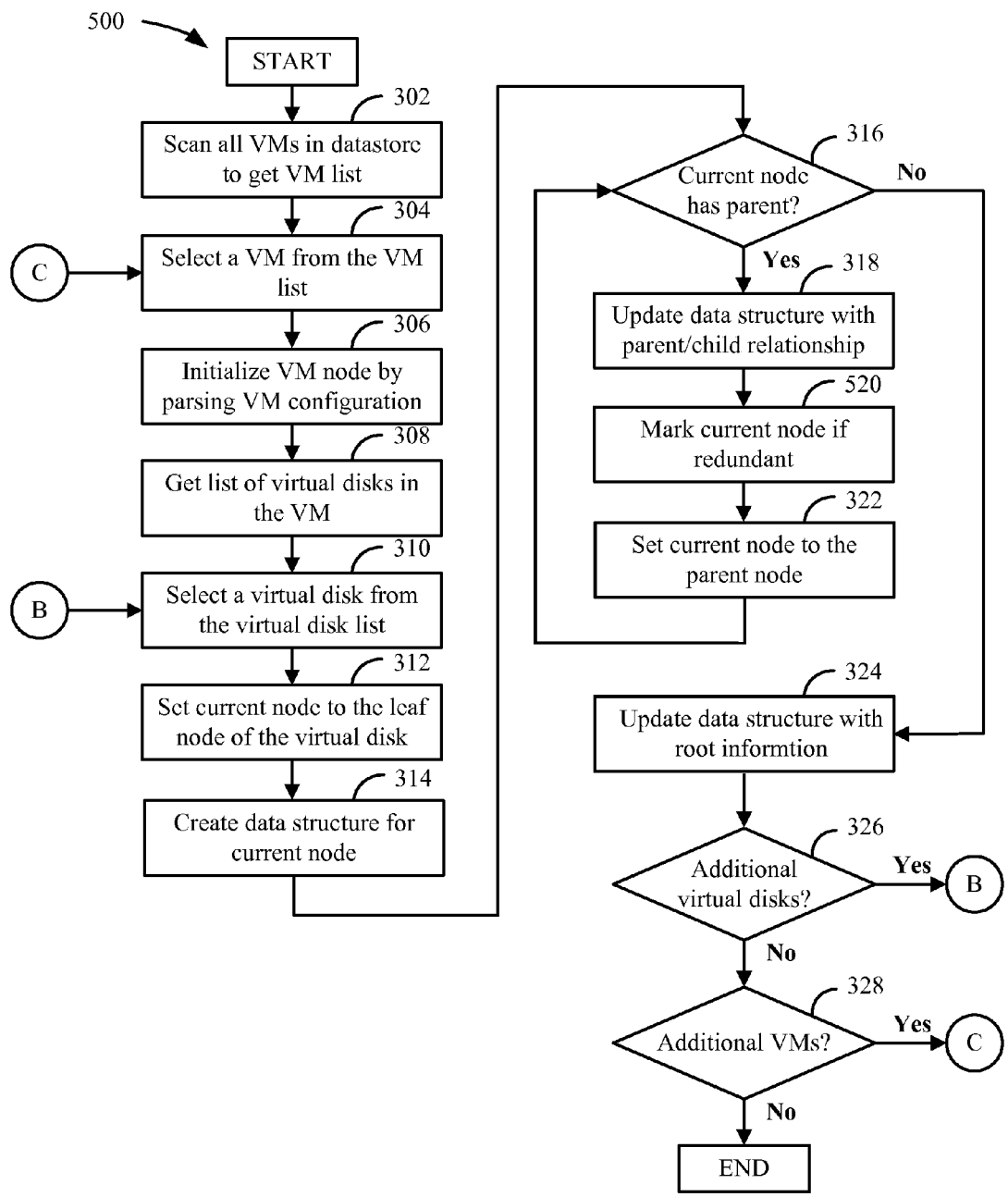
FIG. 5 depicts a flow diagram for parsing virtual machines and identifying redundant redo logs, according to one embodiment of the invention.

FIG. 5 depicts a flow diagram for parsing virtual machines and identifying redundant redo logs, according to one embodiment of the invention. While the example operations are depicted as being performed by the systems illustrated in FIG. 1, it is contemplated that embodiments of the invention may be performed by other suitable systems. The flow diagram is identical to the flow diagram described in conjunction with FIG. 3, but with the addition of an additional step. The method proceeds as described above until step 318 is reached, where lctree application 190 updates the data structure associated with the current node to reflect the parent/child relationship. The method then proceeds to 520, where lctree application 190 marks the current node if the current node is redundant. The current node is redundant if the node has exactly one child and the node is not associated with a snapshot. Note that because a leaf node has no children, a leaf node is not a redundant node by definition. The method then advances to step 322 and proceeds as described above in conjunction with FIG. 3.

Once the redundant redo logs are marked, a list of redundant redo logs may be displayed to the system administrator as candidates for consolidation.

Figure 6:
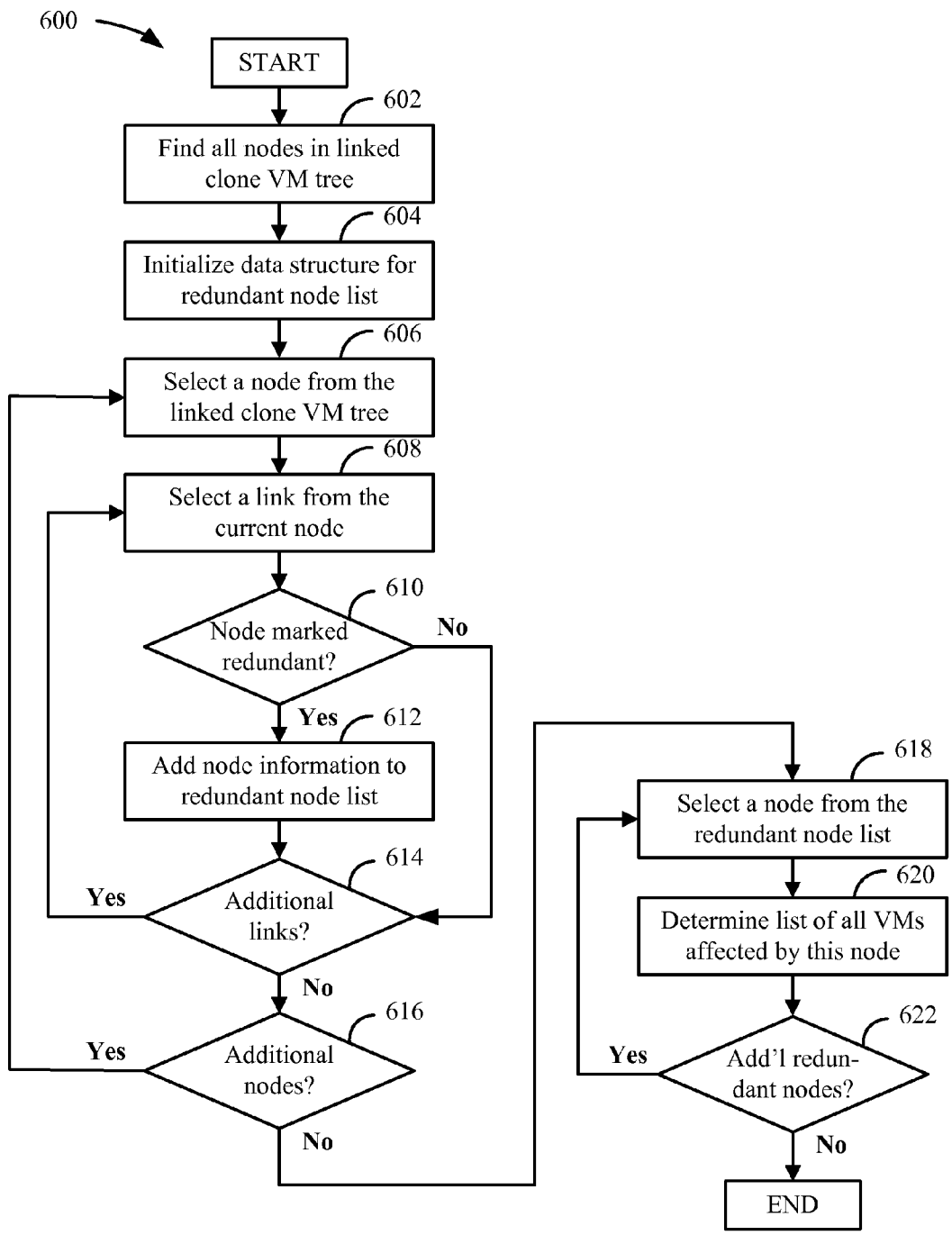
FIG. 6 depicts a flow diagram for generating a list of redundant redo logs within a virtual disk hierarchy, according to one embodiment of the invention.

FIG. 6 depicts a flow diagram 600 for generating a list of redundant redo logs within a virtual disk hierarchy, according to one embodiment of the invention. While the example operations are depicted as being performed by the systems illustrated in FIG. 1, it is contemplated that embodiments of the invention may be performed by other suitable systems.

At step 602, lctree application 190 scans a linked clone VM tree, as created via the method described in association with FIG. 5, to find all nodes within the tree. At step 604, lctree application 190 initializes a data structure that will include the list of redundant nodes associated with the linked clone tree. At step 606, lctree application 190 selects one of the nodes from the linked clone tree. At step 608, lctree application 190 selects a link associated with the selected node. At step 610, lctree application 190 determines whether the link is associated with a node that has been marked as redundant, as described above in association with FIG. 5. If the link is associated with a node that has been marked as redundant, then the method proceeds to step 612, where lctree application 190 adds information associated with the node to the redundant node list. The method then proceeds to step 614. Returning to step 610, if the link is not associated with a node that has been marked as redundant, then the method proceeds directly to step 614, where lctree application 190 determines whether there are additional links associated with the selected node.

If there are additional links, then the method returns to step 608 and proceeds from there. If there are no additional links, then the method proceeds to step 616, where lctree application 190 determines whether there are additional nodes associated with the linked clone VM tree. If there are additional nodes, then the method returns to step 606 and proceeds from there. If there are no additional nodes, then the method proceeds to step 618, where lctree application 190 selects a node from the redundant node list. At step 620, lctree application 190 determines the list of all VMs affected by the selected node. This step may be useful in certain cases such as when the affected VMs need to be suspended during consolidation of redundant disks. At step 622, lctree application 190 determines whether there are additional nodes in the redundant node list. If there are additional nodes, then the method returns to step 618 and proceeds from there. If there are no additional nodes, then the method terminates.

Figure 7:
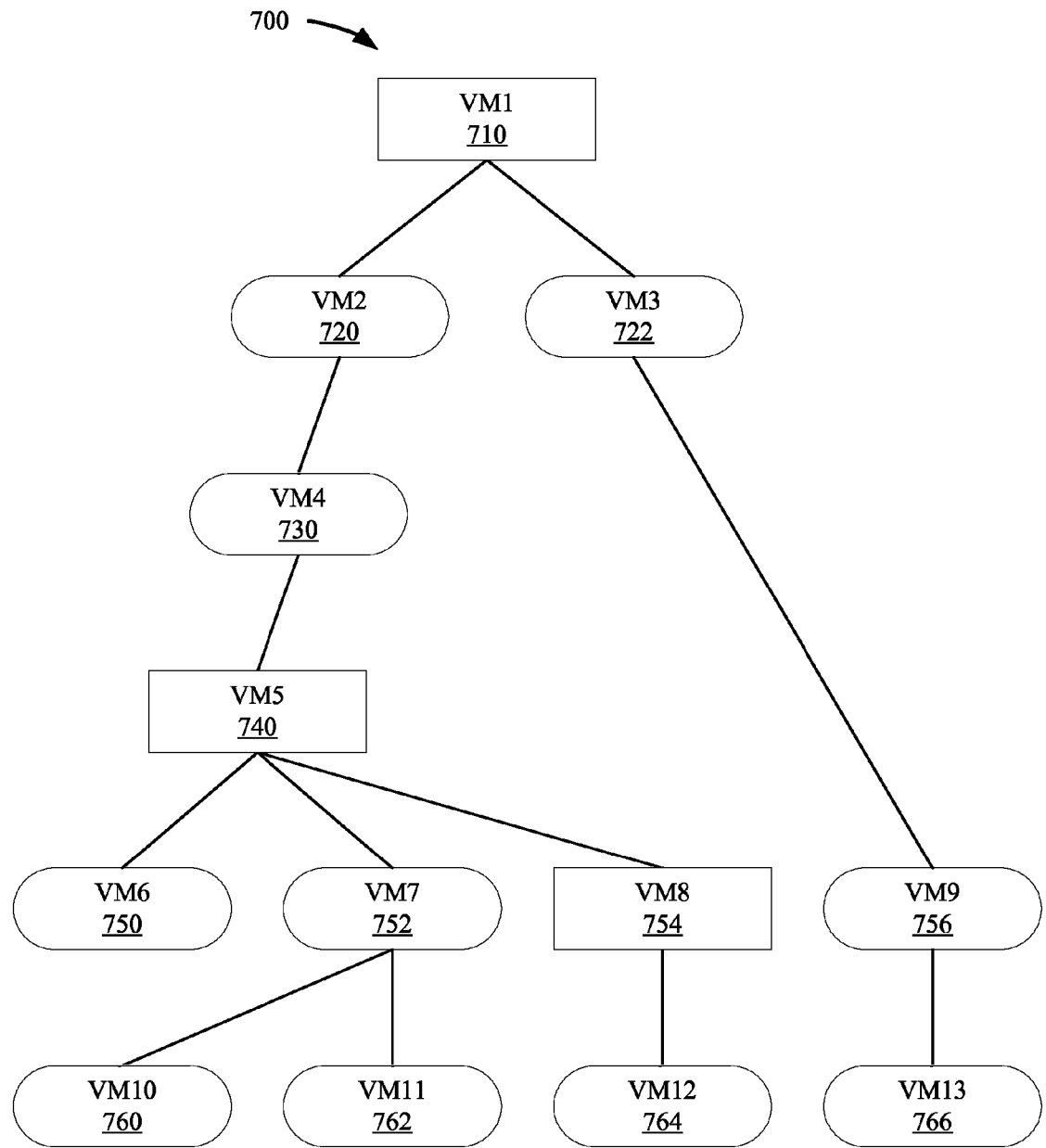
FIG. 7 illustrates a virtual disk hierarchy before consolidating redundant disks.

FIG. 7 illustrates a virtual disk hierarchy 700 before consolidating redundant disks. As shown, hierarchy 700 includes six levels, with base disk VM1 710 occupying the first level, redo logs VM2 720 and VM3 722 occupying the second level, redo log VM4 730 occupying the third level, and so on. As described below, VM2 720 and VM3 722 represent redo logs of VM1. As such, VM2 720 and VM3 722 contain only the differences ("deltas") as compared to the redo logs' parent disk VM1 710. In this example, two branches descend from VM1 710. Redo log VM2 720 includes the differences from VM1 710 associated with the left branch, and redo log VM3 722 includes the differences from VM1 710 associated with the right branch. Accordingly, redo log VM4 730 includes the differences from VM2 720, redo log VM5 740 includes the differences from VM4 740, and so on. As shown in hierarchy 700, VM1 710, VM5 740, and VM8 754 are associated with snapshots, as depicted in FIG. 7 by the alternative graphic utilized to represent each of these nodes.

Over time, continued creation of redo logs may create a long chain of redo logs, many of which have only one child. Performance during read and cloning operations may be increased when redundant redo logs are consolidated to reduce the number of redo logs in a given chain. A node may be consolidated with the node's associated child node when the node has only one child and the node is not associated with a snapshot. For example, VM2 720, VM3 722, VM4 730, and VM9 756 each have one child node and are not associated with a snapshot. All of these nodes represent redundant redo logs, and as such, these nodes are eligible for consolidation with their respective child nodes. VM1 710, VM5 740 and VM7 752 each have multiple children, and thus are ineligible for consolidation; VM1 710, VM5 740, and VM8 754 are associated with a snapshot, and are thus ineligible for consolidation. Finally, VM6 750, VM10 760, VM11 762, VM12 764, VM13 766 are leaf nodes, and therefore have no children. In this case, there is no child node with which to consolidate a leaf node. As such, these leaf nodes are ineligible for consolidation.

Figure 8:
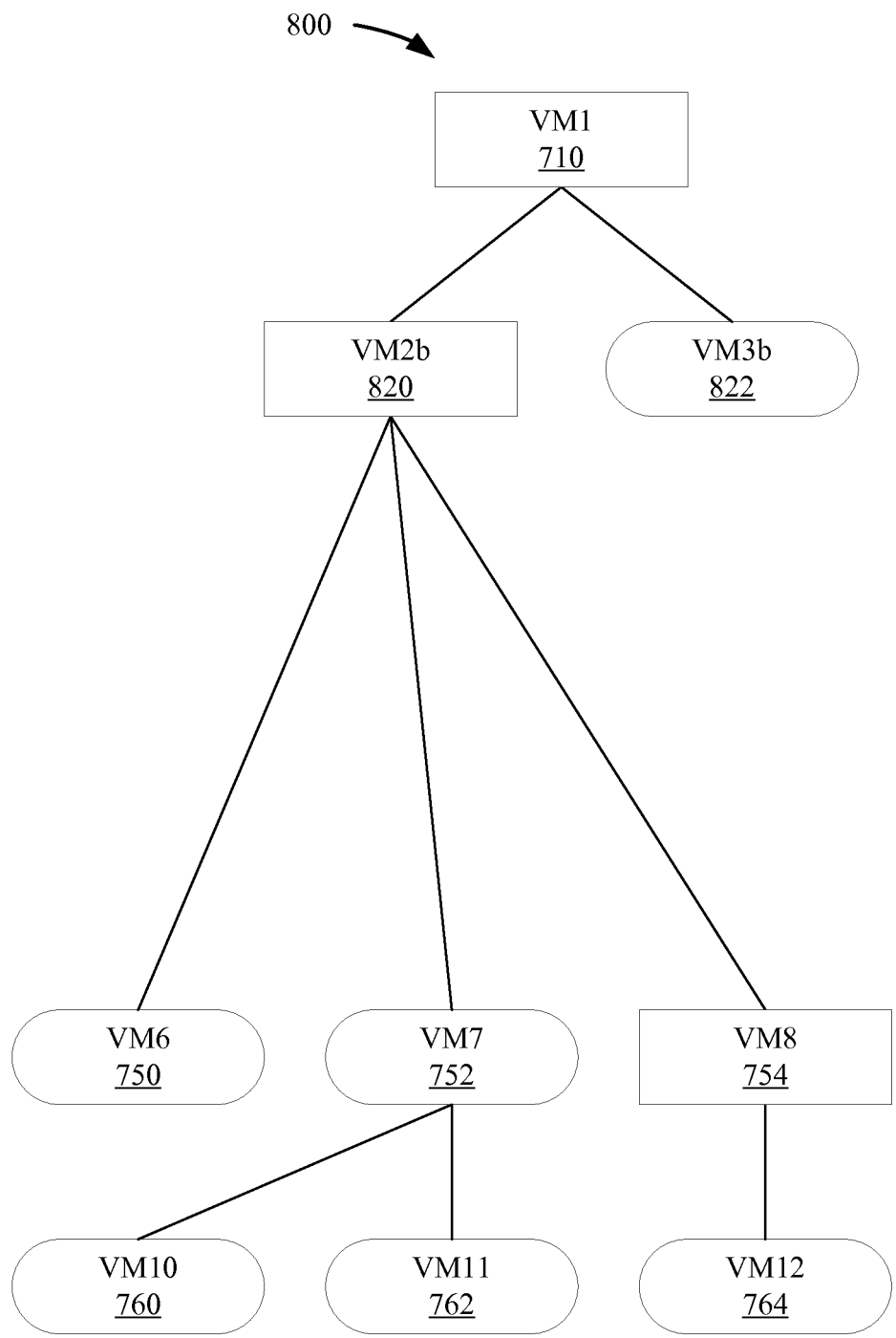
FIG. 8 illustrates a virtual disk hierarchy after consolidating redundant disks.

FIG. 8 illustrates a virtual disk hierarchy 800 after consolidating redundant disks. As described above, VM2 720, VM3 722, VM4 730, and VM9 756 each have one child node and are not associated with a snapshot. All of these nodes represent redundant redo logs, and as such, these nodes are eligible for consolidation with their respective child nodes. VM2 720 may be consolidated with child node VM4 730 which in turn may be consolidated with VM5 740. The difference information from the three original redo logs is consolidated to form a new redo log VM2b 820. This new node replaces the original three redo logs. Because VM5 base 740 was originally associated with a snapshot, new redo log VM2b 820 must also be marked as associated with a snapshot as shown in consolidated hierarchy 800. Under original hierarchy 700, VM management center 102 may create a clone of VM5 740 by starting with VM1 710 and then integrating VM2 720, VM4 730, and VM5 740. Under consolidated hierarchy 800, the same clone may be created by starting with VM1 and integrating a single node: VM2b 820. Similarly, VM3 722 may be consolidated with child node VM9 756 which in turn may be consolidated with child node VM13 766. Accordingly, VM3b 822 replaces the three original redo logs in consolidated hierarchy 800. All other nodes are ineligible for consolidation, as described above. Accordingly, the remaining redo logs from hierarchy 700 remain in their original form in consolidated hierarchy 800.

VMs may be migrated from one host computer to another host computer. Migration may be required, for example, during datastore maintenance or when a datastore is retired. During the migration process, the base disk and redo logs associated with the VM are relocated so that the relocated VM will have access to the same disk-based information as the original VM. A relocate order is selected to ensure a parent is relocated prior to relocating associated child nodes. A proper relocate order ensures that the VM disk hierarchy is properly reconstructed. If an arbitrary order is chosen, parent-child relationships may get reversed when the VM disk hierarchy is reconstructed at the destination host computer.

Figure 9:
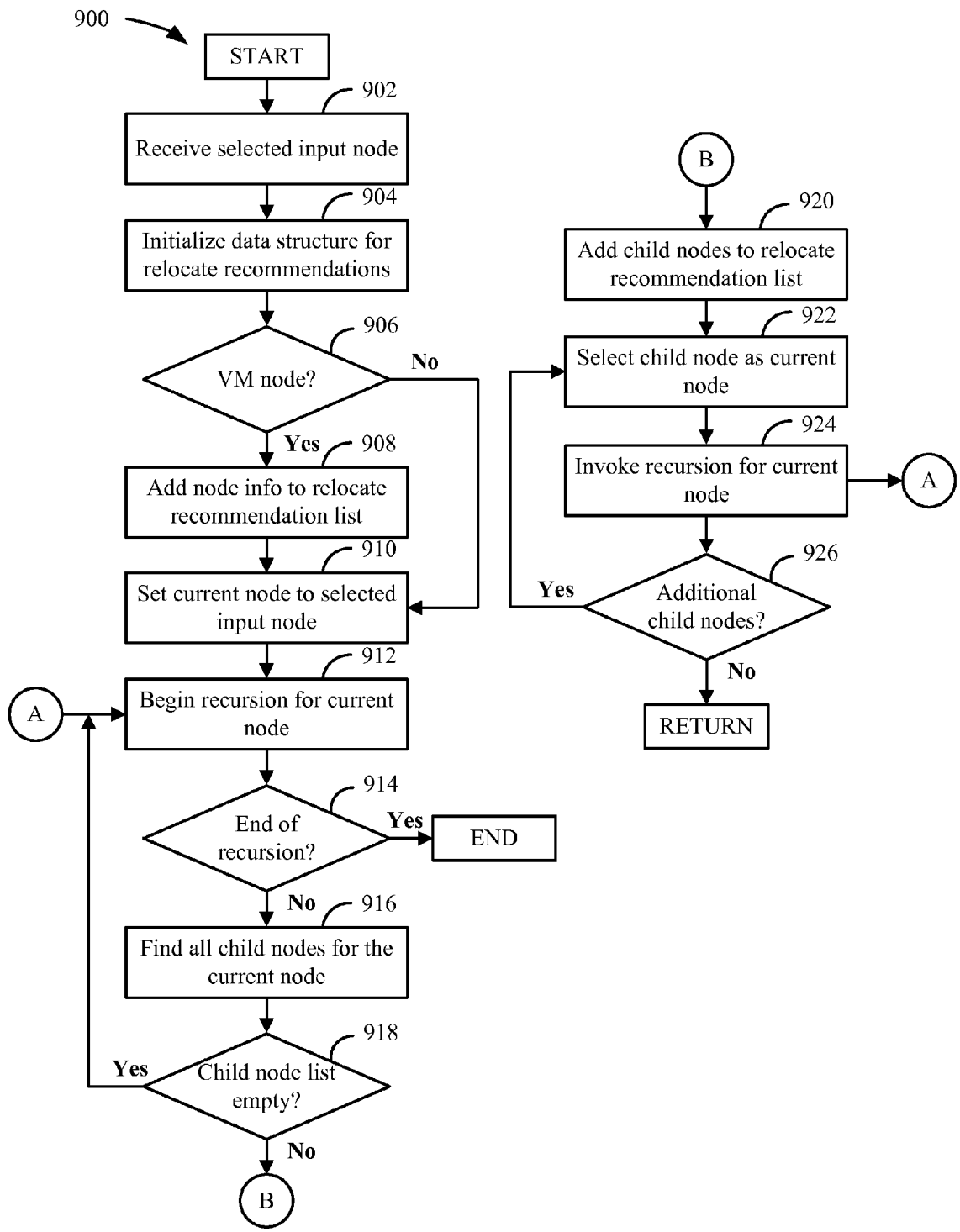
FIG. 9 depicts a flow diagram for generating a relocate recommendation list for a set of virtual disks within a virtual disk hierarchy, according to one embodiment of the invention.

FIG. 9 depicts a flow diagram 900 for generating a relocate recommendation list for a set of virtual disks within a virtual disk hierarchy, according to one embodiment of the invention. While the example operations are depicted as being performed by the systems illustrated in FIG. 1, it is contemplated that embodiments of the invention may be performed by other suitable systems.

At step 902, lctree application 190 receives a selected input node. The input node represents a node associated with a VM that is a candidate for migration. The input node represents the root node of the sub-tree that will be relocated during a VM migration process. At step 904, lctree application 190 initializes a data structure that includes the relocate recommendation list for nodes in the sub-tree whose root node is the input node. Nodes are listed in the recommended order of relocation during the VM migration process. At step 906, lctree application 190 determines whether the input node is a virtual machine node or some other type of node, such as a folder node. If the node is a VM node, then the method proceeds to step 908, where lctree application 190 adds information related to the node to the relocate recommendation list. The method then proceeds to step 910. Returning to step 906, if the node is not a VM node, then the method proceeds directly to step 910, where lctree application 190 sets the current node to the selected input node. The current node is defined as the node from which lctree application 190 is currently searching.

At step 912, lctree application 190 begins a recursive search associated with the current redo log. Initially, lctree application 190 performs a search for the selected input node, set as the current node in step 910. As described below, the recursive search function starting at step 912 is invoked for each additional child node as the child nodes are discovered. As such, multiple recursive calls may be extant during the search process. The search function is complete when all child nodes have been discovered and the recursive search associated with each of the discovered child nodes has completed. At step 914, lctree application 190 determines whether the recursive search has completed, as described above. If the recursive search has completed, then the method terminates. If the recursive function has not completed, then the method proceeds to step 916, where lctree application 190 finds all child nodes of the current node, and places the nodes in a child node list. As described in conjunction with FIG. 8, child nodes of the current node are those nodes which specify the current node as the parent node. At step 918, lctree application 190 determines whether the child node list is empty. The child node list is empty when the current node has no children nodes, and when the recursive search functions as invoked for all child nodes have completed. If the child node list is empty, then the method proceeds to step 920, where the current node is set to a null node. A null node is not a node at all, but rather a null node includes information to indicate that no additional child nodes remain, and, therefore, no additional recursive function calls are to be invoked. The method then returns to step 914, where lctree application 190 waits for all recursive functions to complete. The method then terminates.

Returning to step 918, if the child node list is not empty, then the method proceeds to step 920, where lctree application 190 adds the child nodes discovered in step 916 to the relocate recommendation list. At step 922, lctree application 190 selects one of these child nodes as the current node. At step 924, the recursive function is invoked for the current node. This process invokes a separate instance of the recursive function beginning at step 912, but with the currently selected node as the input node for this instance of the recursive function. At step 926, lctree application 190 determines whether there are additional child nodes. If there are additional child nodes, then the method returns to step 922 and proceeds from there for the additional child nodes. If there are no additional child nodes, then the current instance of the recursive function completes and returns to the point from which the recursive function was invoked. As such, original selected input node and the set of all nodes below the input node in the linked clone tree are added to the relocate recommendation list in an order that ensures the nodes will be properly relocated during a subsequent migration of an associated VM.

As described above, lctree application 190 performs a search of a virtual disk hierarchy to generate a relocate order for a set of virtual disks. Other hierarchical search techniques may be utilized within the scope of the present invention. For example, in one embodiment, a breadth first search (BFS) may be employed, where child nodes at a given depth level are added to the relocate recommendation list. Then, the child nodes at the next level below are added, and so on, level by level, until the bottom of the tree is reached. The bottom of the tree is reached when no additional children are discovered at the current level. In another embodiment, a depth first search (DFS) may be performed, where a specific chain, associated with a child node, is traversed until the bottom of the chain is reached. Then, another chain associated with a second child node is traversed, and so on, until all chains have been traversed. In another embodiment, any technically feasible technique may be utilized to traverse the tree associated with the selected input node, so long as the resulting recommendation list specifies an order in which nodes may be relocated so as to maintain the same tree after VM migration.

Figure 10:
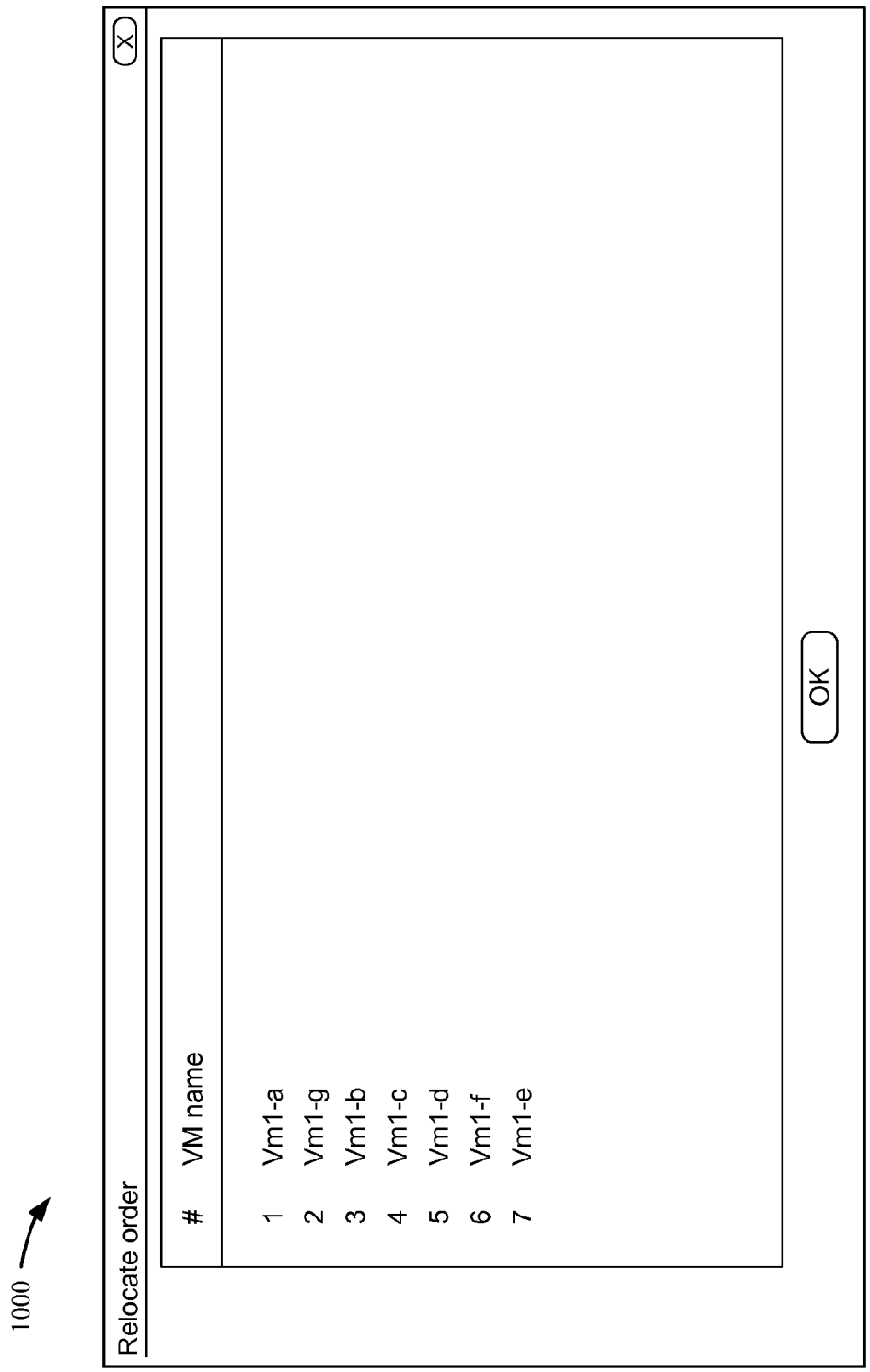
FIG. 10 illustrates a display of a relocate recommendation list associated with a virtual disk hierarchy, according to one embodiment of the present invention.

FIG. 10 illustrates a display of a relocate recommendation list 1000 associated with a virtual disk hierarchy, according to one embodiment of the present invention. Lctree application 190 creates relocate recommendation list 1000 for a given redo log in the hierarchy as part of the VM migration process. Relocate recommendation list 1000 represents the order in which to relocate redo logs associated with VM1 210 of hierarchy 200. To properly relocate a hierarchy on a new virtual machine, any given parent node should be migrated before associated child nodes. When creating relocate recommendation list 1000, lctree application 190 first lists base disk VM1 210 unless the selected base disk is actually a folder node. As described above in association with FIG. 3, VM1 is a folder node, and therefore is not shown in relocate recommendation list 1000. Lctree application 190 then lists nodes at level two, namely the two child nodes of base disk vm1 which are vm1-*a* and vm1-*g*. Lctree application 190 then lists nodes at level three, namely the two child nodes of node vm1-*a* which are vm1-*b* and vm1-*c*. Lctree application 190 then lists nodes at level four, namely the two child nodes of node vm1-*c* which are vm1-*d* and vm1-*f*. Finally, lctree application 190 lists node at level five, namely the child node of node vm1-*d* which is vm1-*e*.

As shown, lctree application 190 lists the nodes at a given level within hierarchy 200 before listing the nodes at a lower level. This is referred to herein as a "breadth first search" (BFS). Alternatively, lctree application 190 may list the nodes in a given branch of hierarchy 200 until a leaf node is reached. Lctree application 190 then traverses a next branch in hierarchy 200 until all branches are traversed to their corresponding leaf nodes. This approach is referred to herein as a "depth first search" (DFS). Alternatively, hierarchy 200 may be traversed in any technically feasible manner so long as each parent node is placed in relocate recommendation list 1000 before any of the parent node's associated child nodes.

Figure 11:
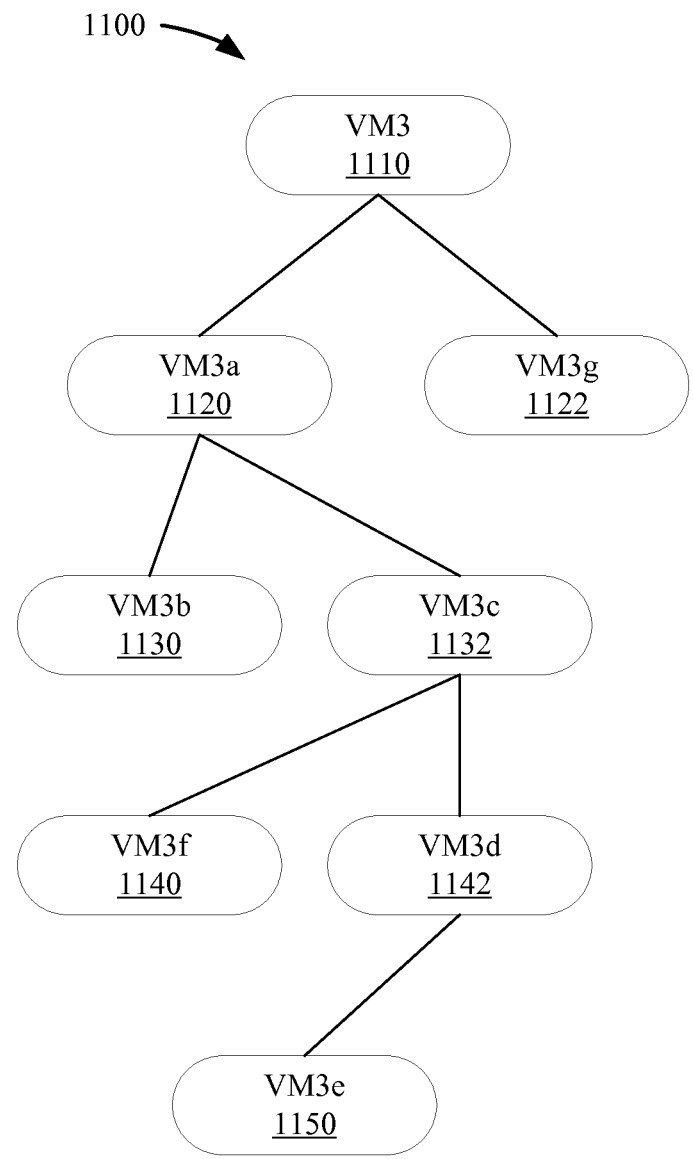
FIG. 11 illustrates a virtual disk hierarchy that has been relocated from a source hierarchy.

FIG. 11 illustrates a virtual disk hierarchy 1100 that has been relocated from a source hierarchy. As shown, each node in hierarchy 200 associated with VM1 has been relocated to a corresponding location in hierarchy 1100 associated with VM3. By using relocate recommendation list 1000, each parent node is placed in hierarchy 1100 before associated child nodes, and proper order is maintained. Relocated hierarchy 1100 thus accurately represents a copy of source hierarchy 200.

In sum, a method of displaying virtual machine disks in a linked clone hierarchy is provided. A linked clone tree application scans a virtual computer system to obtain a set of virtual machines. The application determines the virtual disks corresponding to each of the virtual machines. The application examines parent/child relationships associated with the virtual disks to populate a data structure. The application displays the virtual disks in the linked clone hierarchy using the populated data structure. In addition, the application may further examine the linked clone hierarchy to determine which redo logs are redundant and, thus, candidates for consolidation. Further, the method may receive a selection of a virtual machine to relocate, and determine a set of virtual disks that are child nodes of the base virtual disk of the virtual machine using the data structure.

Advantageously, linked clone hierarchies within a virtual computer system may be parsed and displayed for a system administrator. Redundant redo logs may be identified as candidates for consolidation. Subsequent consolidation may improve performance of associated VMs. A relocate recommendation list may be generated to ensure base disks and redo logs are relocated in proper order, thus ensuring an accurate copy of the original hierarchy after relocation.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of displaying virtual machine disks in a hierarchy, comprising:
scanning a plurality of virtual machines associated with a datastore to generate a virtual machine list, the virtual machines including first and second virtual machines that share at least one virtual disk;
parsing configuration data for the first virtual machine included in the virtual machine list;
identifying a plurality of virtual disks corresponding to the first virtual machine based on the configuration data for the first virtual machine;
examining parent/child relationships associated with the plurality of virtual disks corresponding to the first virtual machine to populate a data structure;
parsing configuration data for the second virtual machine included in the virtual machine list;
identifying a plurality of virtual disks corresponding to the second virtual machine based on the configuration data for the second virtual machine;
examining parent/child relationships associated with the plurality of virtual disks corresponding to the second virtual machine to populate the data structure; and
displaying a graphical representation of the virtual disks corresponding to the first and second virtual machines in a hierarchy using the data structure.

2. The method of claim 1, further comprising:
receiving a selection of a virtual machine to relocate; and
determining a set of virtual disks to relocate by identifying a base virtual disk of the virtual machine and all child nodes of the base virtual disk of the virtual machine using the data structure.

3. The method of claim 2, wherein the determining step utilizes a breadth first search.

4. The method of claim 2, wherein the determining step utilizes a depth first search.

5. The method of claim 1, further comprising:
examining parent/child relationships associated with the virtual disks to locate a virtual disk with only one child virtual disk.

6. The method of claim 5, further comprising merging the first virtual disk and the child of the first virtual disk to form a second virtual disk.

7. The method of claim 6, further comprising determining that the second virtual disk with only one child; and merging the second virtual disk and the child of the second virtual disk to form a third virtual disk.

8. The method of claim 5, further comprising examining a data structure associated with the virtual disks to find a virtual disk that is not associated with a snapshot of a virtual machine.

9. A non-transitory computer readable medium comprising instructions for causing a computer system to carry out a method of displaying virtual machine disks in a hierarchy, the method comprising:
scanning a plurality of virtual machines associated with a datastore to generate a virtual machine list, the virtual machines including first and second virtual machines that share at least one virtual disk;
parsing configuration data for the first virtual machine included in the virtual machine list;
identifying a plurality of virtual disks corresponding to the first virtual machine based on the configuration data for the first virtual machine;
examining parent/child relationships associated with the plurality of virtual disks corresponding to the first virtual machine to populate a data structure;
parsing configuration data for the second virtual machine included in the virtual machine list;
identifying a plurality of virtual disks corresponding to the second virtual machine based on the configuration data for the second virtual machine;
examining parent/child relationships associated with the plurality of virtual disks corresponding to the second virtual machine to populate the data structure; and
displaying a graphical representation of the virtual disks corresponding to the first and second virtual machines in a hierarchy using the data structure.

10. The non-transitory computer readable medium of claim 9, wherein the method further comprises:
receiving a selection of a virtual machine to relocate; and
determining a set of virtual disks to relocate by identifying a base virtual disk of the virtual machine and all child nodes of the base virtual disk of the virtual machine using the data structure.

11. The non-transitory computer readable medium of claim 10, wherein the determining step utilizes a breadth first search.

12. The non-transitory computer readable medium of claim 10, wherein the determining step utilizes a depth first search.

13. The non-transitory computer readable medium of claim 9, wherein the method further comprises:
examining parent/child relationships associated with the virtual disks to locate a virtual disk with only one child virtual disk.

14. The non-transitory computer readable medium of claim 13, wherein the method further comprises merging the first virtual disk and the child of the first virtual disk to form a second virtual disk.

15. The non-transitory computer readable medium of claim 14, wherein the method further comprises determining that the second virtual disk with only one child; and merging the second virtual disk and the child of the second virtual disk to form a third virtual disk.

16. The non-transitory computer readable medium of claim 13, wherein the method further comprises examining a data structure associated with the virtual disks to find a virtual disk that is not associated with a snapshot of a virtual machine.

17. A computer system having virtual machines running therein, the virtual machines being associated with virtual disks that are arranged in a hierarchical manner in a storage device, the virtual disks being linked to one another as a parent or a child, the computer system further having a non-transitory computer readable medium that includes instructions for carrying out a method of displaying virtual machine disks, the method comprising:
scanning a plurality of virtual machines associated with a datastore to generate a virtual machine list, the virtual machines including first and second virtual machines that share at least one virtual disk;
parsing configuration data for the first virtual machine included in the virtual machine list;
identifying a plurality of virtual disks corresponding to the first virtual machine based on the configuration data for the first virtual machine;
examining parent/child relationships associated with the plurality of virtual disks corresponding to the first virtual machine to populate a data structure;
parsing configuration data for the second virtual machine included in the virtual machine list;
identifying a plurality of virtual disks corresponding to the second virtual machine based on the configuration data for the second virtual machine;
examining parent/child relationships associated with the plurality of virtual disks corresponding to the second virtual machine to populate the data structure; and
displaying a graphical representation of the virtual disks corresponding to the first and second virtual machines in a hierarchy using the data structure.

18. The computer system of claim 17, wherein the method further comprises:
examining parent/child relationships associated with the virtual disks to locate a virtual disk with only one child virtual disk.

19. The computer system of claim 17, wherein the storage device comprises a storage array network (SAN) device.

20. The computer system of claim 17, wherein the storage device comprises a network attached storage (NAS) device.

* * * * *